Figure 1A:
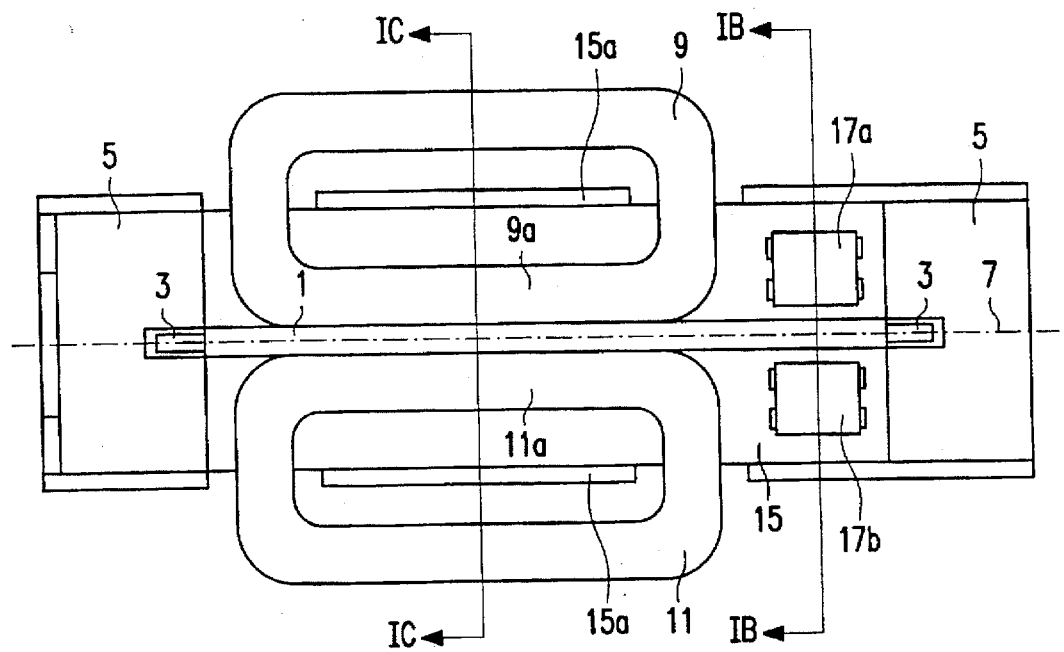

United States Patent [19]

Jansen et al.

[11] Patent Number: 5,691,965
[45] Date of Patent: Nov. 25, 1997

[54] ACTUATOR COMPRISING A ROTATABLE MAGNET BODY; ACTUATOR UNIT COMPRISING THE ACTUATOR AND A CONTROL SYSTEM; MAGNETO-OPTICAL DEVICE COMPRISING THE ACTUATOR, AND SCANNER COMPRISING THE ACTUATOR

[75] Inventors: Gerardus L. M. Jansen; Antonius T. A. Peijnenburg, both of Eindhoven, Netherlands

[73] Assignee: U.S. Philips Corporation, New York, N.Y.

[21] Appl. No.: 538,516

[22] Filed: Oct. 3, 1995

[30] Foreign Application Priority Data

Oct. 6, 1994 [EP] European Pat. Off. .............. 94202894

[51] Int. Cl.$^6$ .................................................. G11B 7/12
[52] U.S. Cl. .................................. 369/44.14; 369/44.11
[58] Field of Search ...................... 369/13, 44.14, 369/44.15, 44.16, 44.17, 44.18, 44.19, 44.21, 44.22, 44.11, 112

[56] References Cited

U.S. PATENT DOCUMENTS

| | | | |
|---|---|---|---|
| 5,023,861 | 6/1991 | Champagne et al. | 369/44.15 X |
| 5,228,017 | 7/1993 | Metsuzaki et al. | 369/44.15 |
| 5,291,345 | 3/1994 | Umeda et al. | 360/59 |
| 5,351,221 | 9/1994 | Ohno | 369/13 |
| 5,361,243 | 11/1994 | Kasahara | 369/44.15 |

FOREIGN PATENT DOCUMENTS

| | | | |
|---|---|---|---|
| 0222916 | 5/1987 | European Pat. Off. . | |
| 0271342 | 6/1988 | European Pat. Off. . | |
| 0566989A2 | 10/1993 | European Pat. Off. | 11/10 |

OTHER PUBLICATIONS

K.R. Sharp, "Multiaxis Optomechanics Key to 2–D Bar code Scanning", Photonics Spectra, Dec. 1992, pp. 98–100.

*Primary Examiner*—Muhammad N. Edun
*Attorney, Agent, or Firm*—Daniel E. Tierney

[57] ABSTRACT

An actuator comprises a permanent magnet body (1) and coil means for cooperation with the magnet body. The magnet body is rotatable about an axis of rotation (7) between, for example two, stop positions. The coil means exclusively comprise at least one active coil section (9a, 11a) of an electrical coil, which coil section extends parallel to the axis of rotation of the magnet body and substantially faces a magnet pole in a stop position of the magnet body.

9 Claims, 5 Drawing Sheets

ACTUATOR COMPRISING A ROTATABLE MAGNET BODY; ACTUATOR UNIT COMPRISING THE ACTUATOR AND A CONTROL SYSTEM; MAGNETO-OPTICAL DEVICE COMPRISING THE ACTUATOR, AND SCANNER COMPRISING THE ACTUATOR

The invention relates to an actuator comprising a permanent magnet body which is rotatable between stop positions about an axis of rotation and has magnet poles situated at opposite sides of the axis of rotation, and further comprising coil means for cooperation with the magnet body to move said body from one stop position to another stop position.

The invention further relates to an actuator unit including an actuator comprising a permanent magnet body which is rotatable between stop positions about an axis of rotation and has magnet poles situated diametrically at opposite sides of the axis of rotation, and further comprising coil means for cooperation with the magnet body to move said body from one stop position to another stop position, and including a control system for the actuator, which control system comprises two Hall sensors.

BACKGROUND OF THE INVENTION

Such an actuator and actuator unit are known from EP 0,271,342 (herewith incorporated by reference). The known actuator serves for rotating a magnet about an axis of rotation for the purpose of magneto-optical recording and comprises the relevant magnet, which is arranged near a magneto-optical recording disc, a first coil surrounding the magnet, and a second coil disposed above the first coil, which is offset from the central axis of the first coil in the circumferential direction of the recording disc. The magnet, which is situated in the centre of the first coil, serves for generating in two stop or end positions a magnetic field which is oriented perpendicularly to the surface of the recording disc. When both coils are energised the magnet, which is in a first stop position, is subjected to a driving force which causes the magnet to be rotated into a second stop position. In the first half of a 180° rotation period the magnet is then accelerated and in the second half it is decelerated. Just before the second stop position is reached the energisation of the second coil is terminated, while the first coil remains energised to maintain the subsequently reached stop position.

The known actuator forms part of an actuator unit, which further comprises a control circuit for controlling the drive currents applied to the first and the second coil. For the detection of a rotation of the magnet relative to the stop positions two Hall elements are used, one element being secured to an inner surface and another element to an outer surface of the second coil.

A disadvantage of the known actuator and actuator unit is that two coils are needed to obtain the desired rotations of the magnet, which makes the construction bulky and complex. Another disadvantage is that upon energisation of both coils the initial torque exerted on the magnet is small, a maximal torque being reached only after a certain rotation. As a result of this, it is difficult to realise large accelerations of the magnet starting from a stop position and large decelerations until a well-defined stop position of the magnet is reached. A further disadvantage is that the first coil is energised permanently, which requires a continuous supply of electric power.

SUMMARY OF THE INVENTION

It is an object of the invention to provide an actuator and an actuator unit which are of simple construction and which can produce rapid rotations of the magnet body with a comparatively low electric power.

The actuator in accordance with the invention is characterised in that the coil means exclusively comprise at least one active coil section of a coil, which coil section extends at least substantially parallel to the axis of rotation of the magnet body and substantially faces one of the magnet poles in the stop positions of the magnet body. When the coil means are energised the special arrangement of the active coil section results in a driving magnetic dipole perpendicular to the dipole of the permanent magnet body in one of the stop positions. An advantage of this is that when the coils means are energised in the stop positions a high initial torque is generated on the magnet body, so that only a very short time is required to move the magnet body from the one stop position into the other stop position. Another advantage is the low power consumption. Moreover, the actuator in accordance with the invention has the advantage that its construction is compact and simple and only a small overall height is required. The magnet body is preferably rod-shaped with a longitudinal axis coinciding with the axis of rotation and can have a circular or square cross-section oriented transversely of the axis of rotation. The north pole and the south pole of a pair of magnet poles are preferably disposed diametrically.

It is to be noted that EP 0,222,916 (herewith incorporated by reference) discloses an actuator having a rotatable rod-shaped permanent magnet for generating a bias field for the purpose of magnet recording, which actuator comprises a drive coil which completely surrounds the magnet. In order to enable a driving force to be generated in the stop or rest positions of the magnet the magnet and the drive coil occupy mutually offset positions, the axis of rotation of the magnet and the central longitudinal coil axis, which extends parallel to the axis of rotation, being spaced apart. The actuator further comprises one Hall element secured to a mounting plate and disposed opposite the magnet. A disadvantage of this known actuator is that after energisation of the drive coil a small initial driving torque is exerted on the magnet, which occupies a stop position. The torque does not increase until the magnet is in rotation. As a result, it is difficult to realise rapid well-defined stepwise movements.

An embodiment of the actuator in accordance with the invention is characterised in that there are provided means, not being coil means, for holding the magnet body in the stop positions. An advantage of this embodiment is that preferential positions coinciding with the stop positions can be realised in a passive manner.

An embodiment of the actuator in accordance with the invention is characterised in that a further active coil section extends parallel to the active coil section, said coil sections substantially facing one of the magnet poles in the stop positions of the magnet body. Owing to the presence of two active coil sections the coil means can generate an at least substantially wholly symmetrical magnetic field. An advantage of this is that the actuator exhibits an at least substantially wholly uniform torque characteristic, as a result of which exactly defined rotations of the magnet body can be realised by means of a simple drive.

An embodiment of the actuator in accordance with the invention is characterised in that said means not being coil means comprise a ferromagnetic element which extends parallel to the axis of rotation of the magnet body and substantially faces one of the magnet poles in the stop positions of the magnet body. The provision of a ferromagnetic element, such as a soft-iron strip, creates preferential positions based on reluctance effects, reluctance forces ensuring that the magnet body is held in one of the preferential positions, i.e. the stop positions. An advantage of this is that an active control system or mechanism is not needed, which may result in a substantial saving of energy. The reluctance effects assist in maintaining the stop positions of the magnet body in two ways. A reluctance torque counteracts a rotation of the magnet body from one of the preferential positions and a force draws the permanent magnet body towards the ferromagnetic element. Since the magnet body is supported by a bearing means the last-mentioned force is compensated for by normal forces in the bearing means, the friction in the bearing means, which preferably comprises two bearings between which the magnet body extends, counteracts a rotation of the magnet body when the coil means are not energised.

An embodiment of the actuator in accordance with the invention is characterised in that the ferromagnetic element forms part of a ferromagnetic plate-shaped body to which the coil means are secured, which coil means extend between the plate-shaped body and the magnet body. The presence of the ferromagnetic plate-shaped body in the direct proximity of the active coil section or the active coil sections short-circuits a part of the magnetic circuit of the active coil section or sections, so that the coil means generate an intensified magnetic field, which considerably improves the drive efficiency.

An embodiment of the actuator in accordance with the invention is characterised in that the plate-shaped body has upright edge portions between which the magnet body and the coil means extend. As a result of this measure, the plate-shaped body used in the actuator in accordance with the invention has a magnetic shielding function in addition to the other functions already mentioned. The plate-shaped body both counteracts the leakage of internal magnetic fields and the penetration of external magnetic fields into the actuator. The last-mentioned aspect is of particular importance in order to prevent a position, such as a preferential position, of the magnet body from being disturbed. A further advantage of the presence of upright wall portions is that it mitigates a possible adverse effect of inactive coil sections of the drive coil or drive coils.

The actuator unit in accordance with the invention is characterised in that an actuator in accordance with the invention is used, the Hall sensors of the control system, in the stop positions of the magnet body, being disposed at opposite sides of a plane which contains the axis of rotation and is oriented transversely of one of the magnet poles, the control system comprising a matrix unit having a first input and a second input for signals issuing from the Hall sensors. The Hall sensors supply signals which depend on the perpendicular magnetic induction of the magnetic field at the location of the sensors. During rotation of the magnet body, which has a north pole and a south pole, signals are generated which vary sinusoidally in dependence upon the angle of rotation of the magnet body and which are shifted in phase relative to one another. Surprisingly, it has been found that adding and subtracting these signals results in signals which are measures of both the position and the positional error of the magnet body and which consequently enable the coil means to be controlled so as to obtain a desired position of the magnet body. It is to be noted that a matrix unit is to be understood to mean an arithmetic or adder/subtracter unit.

An embodiment of the actuator unit in accordance with the invention is characterised in that the matrix unit has a first output for a signal representing a positional error of the magnet body and a second output for a signal representing an instantaneous position of the magnet body, the control system comprising a first control unit connected to the first output of the matrix unit and a second control unit connected to the second output of the matrix unit, which second control unit has an input for a signal representing a desired position of the magnet body, the first control unit and the second control unit being interconnected and each being connected to an amplifier unit for energising the coil means. During use of the actuator unit the first control unit compares the desired position with the instantaneous position of the magnet body. If there is a difference between the two last-mentioned positions a pulse is applied to the amplifier unit in order to rotate the magnet body. For an exact approach to the desired position the second control unit drives the first control unit for a given time interval.

The invention further relates to a magneto-optical device comprising a turntable for a magneto-optical disc, which turntable is rotatable about an axis of rotation, and comprising a unit for recording information and further comprising an actuator in accordance with the invention or an actuator unit in accordance with the invention, the axis of rotation of the magnet body of the actuator extending at least substantially perpendicularly to the axis of rotation of the turntable. The magneto-optical disc intended here has an information layer which can be inscribed by means of a radiation beam, particularly a laser beam, produced by a radiation source and aimed at the information layer, and an external magnetic field, also referred to as bias field, present at the information layer. By locally heating the information layer by means of an optical beam the coercive field strength of the material in the information layer is reduced in such a manner that the local magnetisation in the information layer becomes equal to the magnetisation of the bias field. The polarity of the bias field then determines the local polarity in the information layer, which polarity is retained by the information layer after turn-off of the radiation source. By means of a permanent magnet a substantial magnetic induction can be realised without consumption of energy. Magneto-optical recording requires, for example, an induction of 300 Gauss measured at a distance of 1 mm from the magnet. This can be achieved by with a rod-shaped magnet body of NdFeB having a square cross-section of $0.80 \times 0.80$ mm$^2$.

The magneto-optical device in accordance with the invention can be used for the storage of audio and/or video and/or data information.

For reversing the polarity of the bias field required for magneto-optical recording the preferably rod-shaped magnet body, which has magnet poles at two opposite longitudinal surfaces parallel to the axis of rotation, should be rotated through 180° about the axis of rotation, which coincides with the longitudinal axis of the magnet body. By means of the actuator in accordance with the invention this can be effected in a very efficient and rapid manner, a polarity reversal being possible within, for example, 1 ms.

The invention further relates to another suitable application of the actuator in accordance with the invention or the actuator unit in accordance with the invention, i.e. a scanner. A scanner is known per se from Photonics Spectra, December 1992, pp. 98–100; Kevin R. Sharp (herewith incorporated by reference). The known scanner is a two-dimensional bar code scanner and comprises a housing with a laser diode, a mirror arrangement and a photodetector. The mirror arrangement comprises two mirrors which are rotatable with different speeds about two mutually perpendicular axes by means of two resonant drive elements.

The scanner in accordance with the invention comprises a radiation source and further comprises an actuator in accordance with the invention or an actuator unit in accordance with the invention, a lateral surface of the magnet body which extends parallel to the axis of rotation of the magnet body of the actuator being provided with a mirror or a mirror surface for reflecting a radiation beam issuing from the radiation source. An advantage of the scanner in accordance with the invention inter alia resides in the efficient drive system for the mirror, which is not restrained by a resonant drive element. Moreover, the preferably rod-shaped magnet body results in a minimal moving mass.

An embodiment of the scanner in accordance with the invention is characterised by the presence of a further actuator in accordance with the invention or a further actuator unit in accordance with the invention comprising a further actuator, a lateral surface of the magnet body of the further actuator being provided with a mirror for reflecting a radiation beam issuing from the radiation source and the axis of rotation of the actuator making an angle with the axis of rotation of the magnet body of the further actuator. The axes of rotation of said magnet bodies preferably make an angle of 90° with one another. Thus, one of said actuators provides deflection of the radiation beam from the radiation source, particularly a laser source, in a first direction, for example the X direction in a system of orthogonal axes, and the other actuator provides deflection in a second direction, for example the Y direction. By mutually different drives of the actuators a scanning beam emanating from the scanner can perform any desired scanning movement over a surface on which the beam is incident. This makes it possible, for example, to form a Lissajous figure or to perform a line scan.

BRIEF DESCRIPTION OF THE DRAWING FIGURES

Figure 1B:
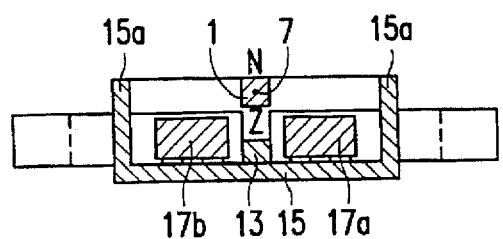
Figure 1C:
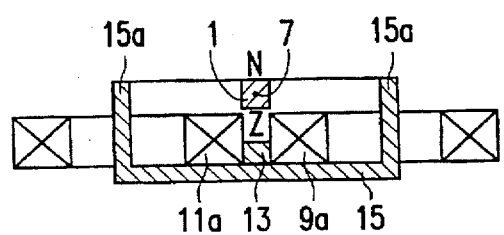
Figure 2:
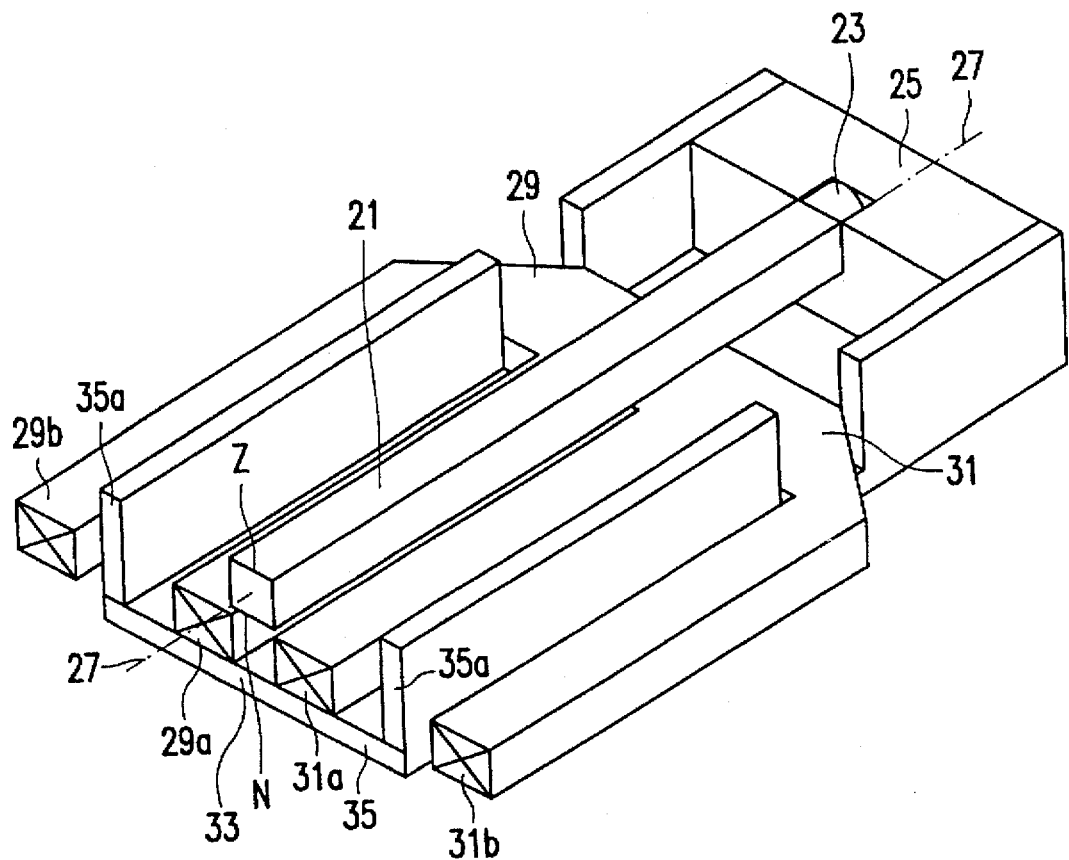
Figure 4:
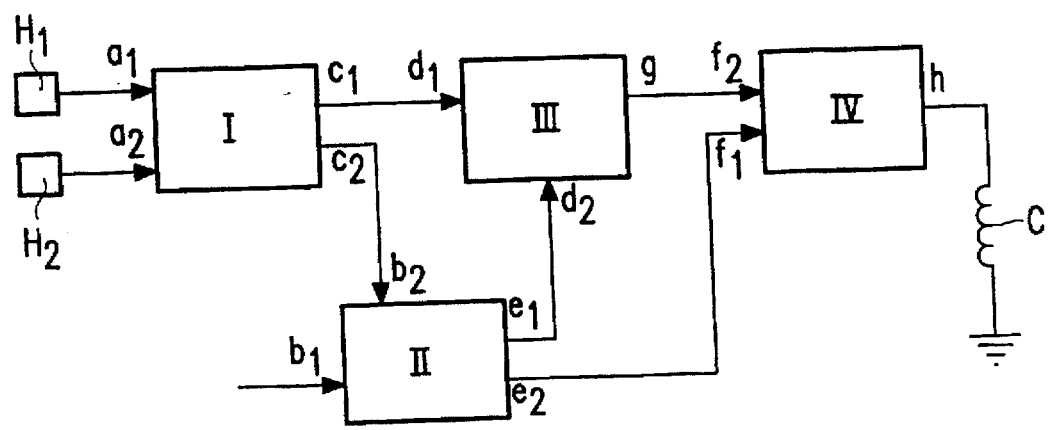
Figure 3A:
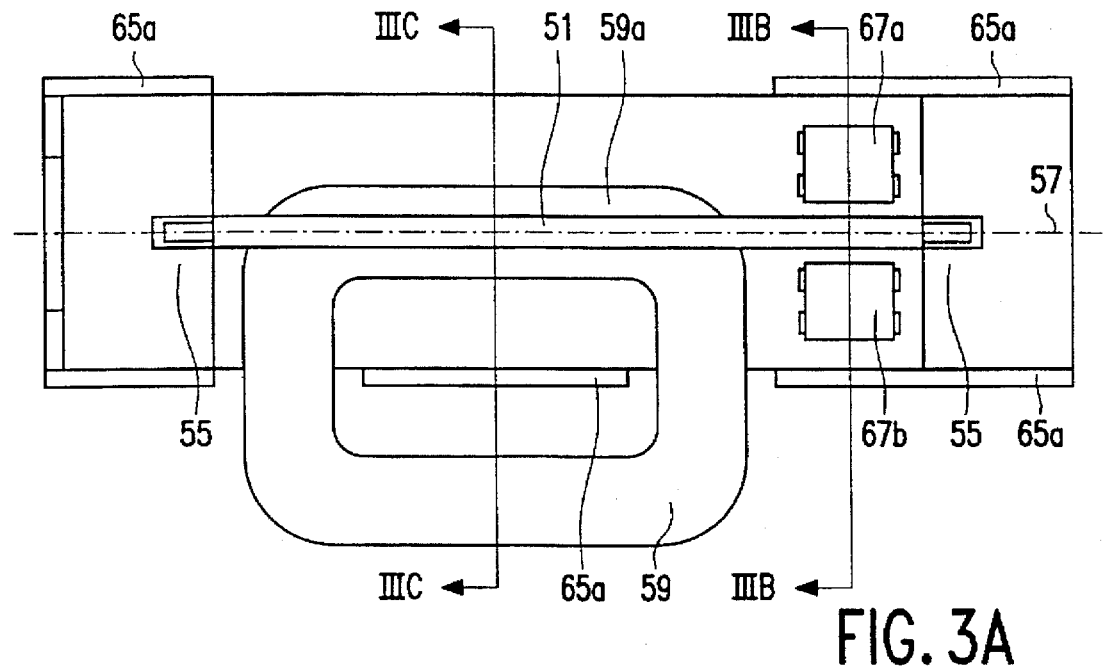
Figure 3B:
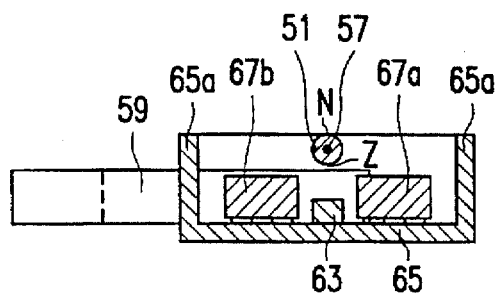
Figure 3C:
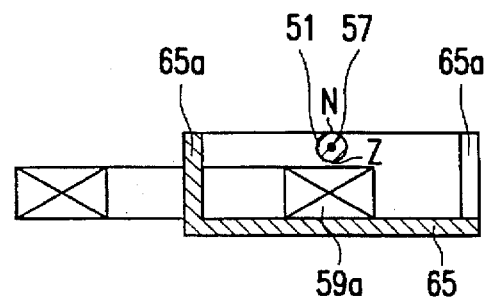
Figure 5:
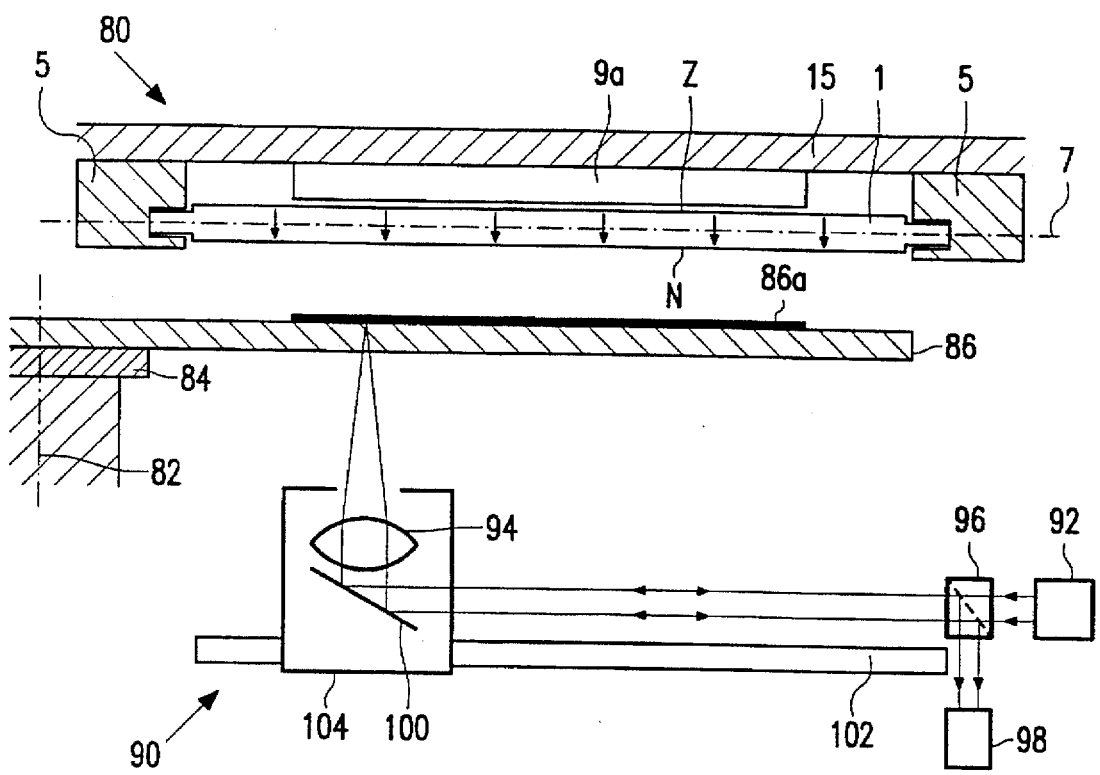
Figure 6A:
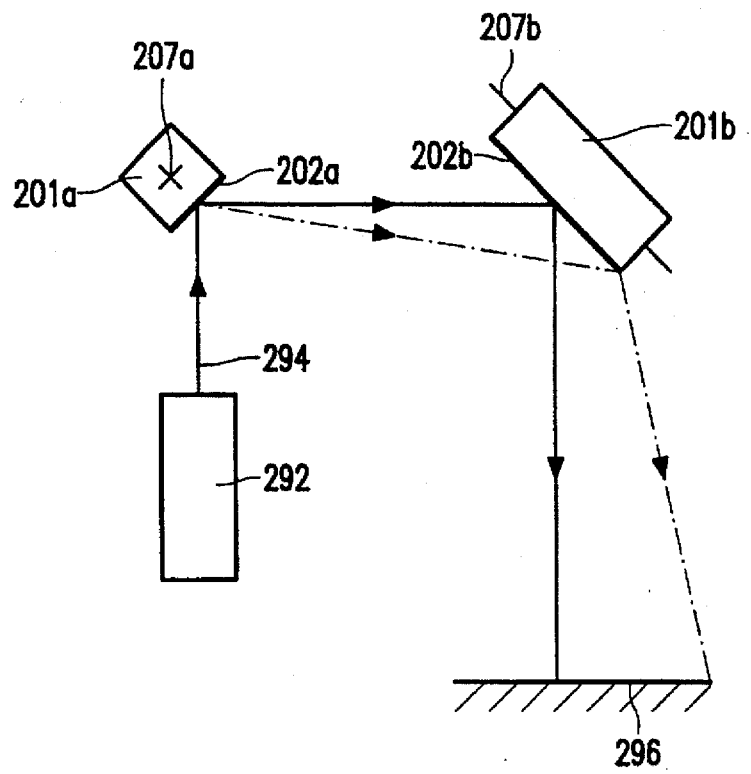
Figure 6B:
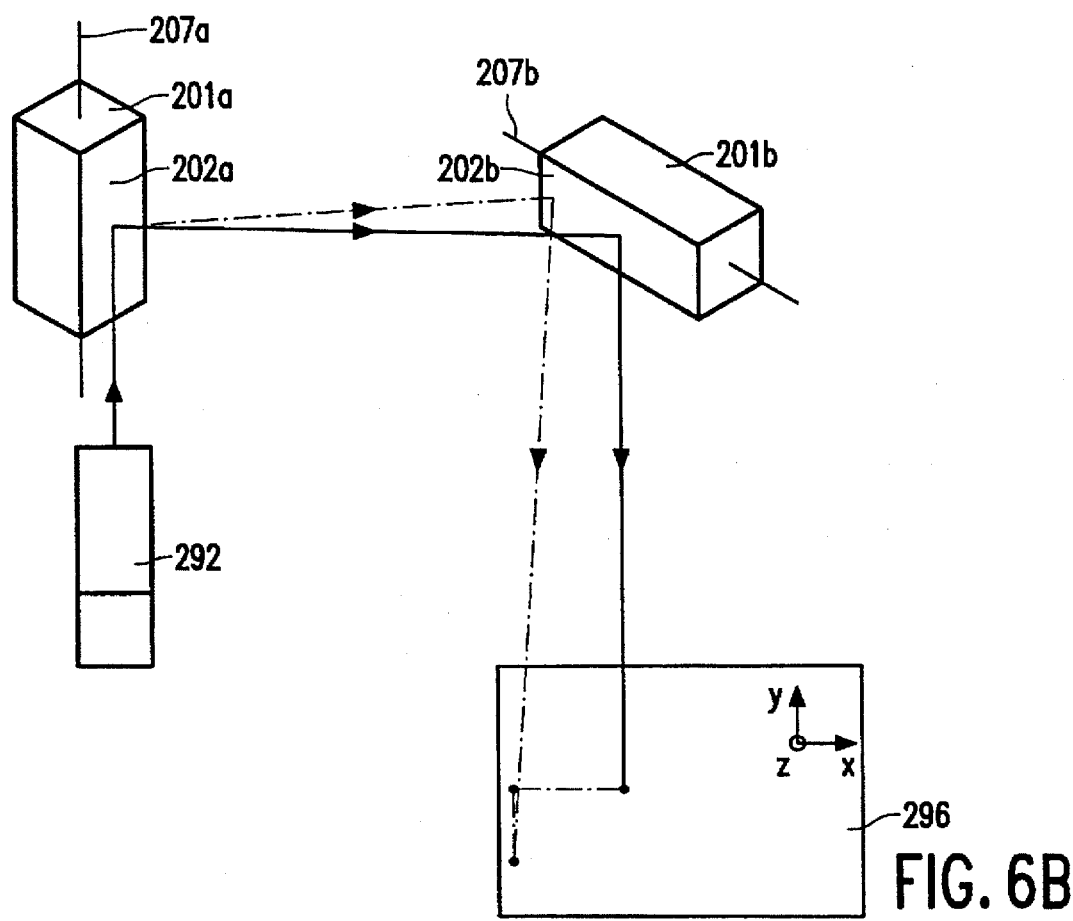

The invention will now be described in more detail, by way of example, with reference to the drawings, in which FIG. 1A is a diagrammatic plan view showing a first embodiment of the actuator in accordance with the invention, FIG. 1B is a sectional view $I_B$—$I_B$ of the actuator shown in FIG. 1A, FIG. 1C is a sectional view $I_C$—$I_C$ of the actuator shown in FIG. 1A, FIG. 2 is a diagrammatic perspective view showing a part of a second embodiment of the actuator in accordance with the invention, FIG. 3A is a diagrammatic plan view showing a third embodiment of the actuator in accordance with the invention, FIG. 3B is a sectional view $III_B$—$III_B$ of the actuator shown in FIG. 3A, FIG. 3C is a sectional view $III_C$—$III_C$ of the actuator shown in FIG. 3A, FIG. 4 is a block diagram showing a control system of an embodiment of the actuator unit in accordance with the invention, FIG. 5 shows diagrammatically an embodiment of the magneto-optical device in accordance with the invention, FIG. 6A is a diagrammatic plan view showing an embodiment of the scanner in accordance with the invention, and FIG. 6B is a perspective view of the scanner shown in FIG. 6A.

DESCRIPTION OF THE INVENTION

The actuator in accordance with the invention shown in FIGS. 1A, 1B and 1C comprises a magnet body 1 formed by a permanent magnet of, for example, NdFeB. The permanent magnet body 1 is rod-shaped and in the present embodiment it is of square cross-section and has at its axial ends circularly cylindrical end journals 3, which form part of a bearing means 5 mounted in a frame. The bearing means 5, which defines an axis of rotation, comprises for example two plain bearings. The magnet used in the magnet body 1 has one pair of magnet poles N and Z, situated at opposite sides of the longitudinal axis of the magnet body 1, which axis coincides with the axis of rotation 7.

The actuator further comprises coil means, in the present example formed by two active coil sections 9a and 11a of two, for example flat, electrical coils 9 and 11, respectively. The active coil sections 9a and 11a, hereinafter also referred to as active coil section and further active coil section, extend parallel to the axis of rotation 7.

The actuator further comprises means, not being coil means, for holding the magnet body 1 in two stop positions. These means include a ferromagnetic element 13, which in the present example is constituted by a soft-iron strip which extends parallel to the axis of rotation. The element 13 ensures that when the coil means are not energised the magnet body 1 is in a first stop position, in which the south pole Z faces the element 13 as shown in FIGS. 1A–1C, or in a second stop position, in which the north pole N faces the element 13. As is apparent from the drawing, the active coil sections 9a and 11a are so arranged that they face a magnet pole in the stop positions of the magnet body 1. In the present embodiment the element 13 is situated on a ferromagnetic plate-shaped body 15 with which it is integral or to which it is secured. The body 15 comprises two upright wall positions 15a, which extend parallel to the axis of rotation 7 and between which the magnet body 1 and the active coil sections 9a and 11a extend. The other inactive coil sections 29b and 31b of the coils 29 and 31 are situated mainly outside the area bounded by the upright wall portions 15a.

If desired, the actuator may be provided with two Hall sensors 17a and 17b to determine the position of the magnet body 1. The Hall sensors 17a and 17b are mounted on the plate-shaped body 15 and are disposed at opposite sides of the axis of rotation 7.

The actuator in accordance with the invention shown in FIG. 2 comprises a permanent magnet body 21 which is rotatable between stop positions about an axis of rotation 27. In the present example the basically rod-shaped magnet body 21 is of square cross-section and consequently has four identical longitudinal or outer surfaces. The magnet body 21 may have one or two pairs of magnet poles. The drawing shows only one pair of magnet poles Z, N. At its axial ends the magnet body 21 has round end journals 23 supported in stationary bearing elements 25. In FIG. 2 only one bearing is shown.

The actuator further has coil means, which exclusively comprise a first active coil section 29a and a second active coil section 31a. Both active coil sections 29a and 31a extend parallel to the axis of rotation 27 and in the stop positions of the magnet body 21 they face one of the magnet poles. The actuator further comprises a ferromagnetic plate-shaped body 35 with an element 33 facing one of the magnet poles in the stop positions of the magnet body 35. The plate-shaped body 35, which carries the active coil sections 29a and 31a of the coils 29 and 31, further comprises two upright shielding edge portions 35a.

The actuator in accordance with the invention shown in FIGS. 3A, 3B and 3C comprises a permanent magnet body 51 and a coil 59 having one active coil section 59a. The magnet body 51 is elongate, is of round or circularly cylindrical cross-section, is supported in two bearings 55 and is rotatable about an axis of rotation 57. The magnet body is diametrically magnetised, has tow magnet poles N and Z at opposite sides of the axis of rotation and has two stop positions. The actuator coil means formed by the active coil section 59a extends parallel to the axis of rotation 57, is situated opposite the magnet body 51 and faces one of the magnet poles in the stop positions of the magnet body 51.

The actuator further comprises a ferromagnetic plate 65 with a ferromagnetic element 63 and upright wall portions 65a. The element 63, which faces the magnet body 51, is for example cam-shaped or strip-shaped and serves to secure the stop positions of the magnet body 51 when the coil means is not energised. The actuator further has two Hall sensors 67a and 67b in a similar way as shown in FIGS. 1A and 1B.

Together with the example of a control system shown in FIG. 4 the actuator shown in FIGS. 1A–1C or 3A–3C forms an embodiment of the actuator unit in accordance with the invention.

The block diagram in FIG. 4, which shows the electronic control system of the actuator unit, comprises four blocks, i.e. a first block I, which represents a matrix unit, a second block II, which represents a second control unit, a third block III, which represents a first control unit, and a fourth block, which represents an amplifier unit IV. The matrix unit I has two inputs $a_1$ and $a_2$ for applying two signals from the Hall sensors, designated $H_1$ and $H_2$ in FIG. 4, and the second control unit II has an input b for applying a signal representing the desired position of the magnet body of the actuator in accordance with the invention. Although the Hall sensors measure a leakage field of the magnet body, which may be disturbed by the presence of the plate-shaped body, it is possible to generate sine and cosine signals, respectively by adding and subtracting the signals from the Hall sensors. The sum of the signals from the Hall sensors provides information about the position of the magnet body and, as a consequence, about the polarity of the magnet pole facing the Hall sensors, whereas the difference provides information about the positional error of the magnet body.

The matrix unit I has two outputs, of which an output $c_1$ is connected to an input $d_1$ of the first control unit III and an output $c_2$ is connected to an input $b_2$ of the second control unit II. The second control unit II has two outputs, of which an output $e_1$ is connected to the input $d_2$ of the first control unit and an output $e_2$ is connected to an input $f_1$ of the amplifier unit IV. The amplifier unit IV further has an input $f_2$, to which an output g of the first control unit is connected, and an output h, which is connected to the coil means, denoted by the letter C in FIG. 4, of the actuator in accordance with the invention.

The control system operates as follows. A request for a certain magnetic field direction, which is caused by a certain position or orientation of the magnet body, is presented to the second control II. The second control unit then determines whether the instantaneous magnetic field direction, which is dictated by the instantaneous position of the magnet body, corresponds to the desired direction. This is achieved in that in the second control unit II the desired position signal is compared with the position signal from the matrix unit I. If the two signals are identical no action is taken; if there is a difference the coil means C are energised via the amplifier unit IV to move the magnet body of the actuator from one stop position to another stop position, the first control unit III ensuring an exact approach to the desired position of the magnet body by means of the positional error signal from the matrix unit I.

The magneto-optical device in accordance with the invention shown in FIG. 5 includes an embodiment of the actuator unit in accordance with the invention. The actuator unit comprises, for example, the actuator shown in FIGS. 1A–1C and the control system shown in FIG. 4. The actuator, which bears the reference numeral 80 in FIG. 5, comprises the permanent magnet body 1, which is supported in the bearing means 5, is rotatable between two stop positions about an axis of rotation 7 and has magnet poles N and Z at opposite sides of the axis of rotation 1, and further comprises coil means for cooperation with the magnet body 1, in order to rotate the magnet body 1 from one stop position, for example as shown, into another stop position, which in the present example is reached after a rotation through 180°. The coil means comprise at least one active coil section of an electrical coil, which coil section extends parallel to the axis of rotation 7 and in the stop positions faces a magnet pole N or Z. This embodiment has two active coil sections 9a and 11a, of which FIG. 5 only shows the coil section 9a. The coil sections are mounted on the ferromagnetic plate-shaped body 15.

The magneto-optical device shown in FIG. 5 further comprises a turntable 84 which is rotatable about an axis of rotation 82 and is drivable by an electric motor. The turntable serves to support a disc-shaped record carrier 86, particularly a magneto-optical recording disc, having a recordable and/or readable magneto-optical (MO) layer 86a. The axis of rotation 82 of the turntable 84 extends perpendicularly to the axis of rotation 7 of the magnet body 1. The device shown in FIG. 5 further comprises a unit 90 for recording and/or reading information. The unit 90 inter alia comprises a light source 92, particularly a laser device, an objective 97 for projecting a focused radiation spot on the MO layer 86a, a beam splitter 96, and a photodetector 98. If desired, a mirror 100 may be used, as in the present example. The objective 94 is preferably movable in focusing directions transverse to the MO layer 86a by drive means, which are not shown here and are known per se. Moreover, the objective 94 is supported to be movable in a radial direction relative to the axis of rotation 82. For this purpose the present example uses a slide 104 which is movable along a rectilinear guide 102. The guide 102 extends parallel to the basically radially oriented axis of rotation 7 of the magnet body 1. In operation of the device 80, particularly during recording in the magneto-optical disc 86, an alternating bias field is required, particularly a magnetic field with magnetic vectors oriented transversely of the MO layer 86a. A request for a desired magnetic polarity from a disc controller is then applied to the second control unit (see FIG. 4, block II) of the control system.

The scanner in accordance with the invention shown in FIGS. 6A and 6B has two actuators in accordance with the invention, for example two actuators as shown in FIG. 2. Of these actuators only the magnet bodies are shown. The scanner is intended for 2D scanning and comprises a radiation source 292, particularly a laser source, a first actuator in accordance with the invention having a magnet body 201a, which is rotatable about an axis of rotation 207a, and having a second actuator in accordance with the invention having a magnet body 201b, which is rotatable about an axis of rotation 207b. The elongate or rod-shaped magnet bodies each have at least one reflecting longitudinal or lateral surface 202a and 202b, respectively, for deflecting a radiation beam 294 produced by the radiation source 292. The axis of rotation 207a extends perpendicularly to the axis of rotation 207b. Viewed in a system of orthogonal axes XYZ the body 201a produces a deflection of the radiation beam 294 in an X direction and the body 201b produces a deflection in a Y direction in a projection area 296. By separately driving the actuators it is in principle possible to perform any desired scanning movement over the area 296. The beam of light reflected from the projection area 296 contains information about this area and is detected by an optical detection system.

It is to be noted that the scope of the invention is not limited to the exemplary embodiments disclosed herein.

We claim:

1. A actuator unit comprising:
   a) a permanent magnet body which is rotatable between stop positions about an axis of rotation, the magnet body having at least two magnet poles situated diametrically at opposite sides of the axis of rotation;
   b) coil means for cooperation with the magnet body to move said body from one stop position to another stop position, the coil means exclusively comprised of two active coil sections extending substantially parallel to the axis of rotation of the magnet body and substantially facing one and the same of said magnet poles in the stop positions of the magnet body;
   c) ferromagnetic element means substantially facing one of the magnet poles in the stop positions of the magnet body; and
   d) a control system, which control system comprises two Hall sensors, the Hall sensors of the control system, in the stop positions of the magnet body, being disposed at opposite sides of a plane which is oriented transversely of the magnet poles and passes through the axis of rotation, the control system having a matrix unit having a first input and a second input for signals issuing from the Hall sensors.

2. An actuator unit as claimed in claim 1, wherein the matrix unit has a first output for a signal representing a positional error of the magnet body and a second output for a signal representing an instantaneous position of the magnet body, the control system further includes a first control unit having an input connected to the first output of the matrix unit and a second control unit having an input connected to the second output of the matrix unit, the second control unit having an input for a signal representing a desired position of the magnet body, an output of the second control unit connected to an input of the first control unit, and outputs of each of the first and second control units being connected to an amplifier unit for energizing the coil means.

3. A magneto-optical device comprising a turntable for a magneto-optical disc, which turntable is rotatable about an axis of rotation, and comprising a recording unit for recording information and further comprising an actuator unit as claimed in claim 1, the axis of rotation of the magnet body of the actuator unit extending substantially perpendicular to the axis of rotation of the turntable.

4. A scanner comprising:
   a) a radiation source; and
   b) an actuator unit comprising:
      i) a permanent magnet body which is rotatable between stop positions about an axis of rotation and which has magnet poles situated diametrically at opposite sides of the axis of rotation;
      ii) coil means for cooperation with the magnet body to move said body from one stop position to another stop position, wherein the coil means is exclusively comprised of two active coil sections, the coil sections extending substantially parallel to the axis of rotation of the magnet body and substantially facing one of the magnet poles in the stop positions of the magnet body; and
      iii) a lateral reflecting surface adjacent the magnet body, the surface extending parallel to the axis of rotation of the magnet body, the surface positionable for reflecting a radiation beam issuing from the radiation source.

5. A scanner as claimed in claim 4, further comprising a second actuator unit of the kind as described in claim 4, the lateral reflecting surface adjacent the magnet body in the second actuator unit position&hie to intersect a radiation beam issuing from the radiation source and reflected by the reflecting surface adjacent the magnet body in the actuator unit.

6. A scanner as claimed in claim 4, further comprising means for holding the magnet body in the stop positions.

7. A scanner as claimed in claim 6, wherein said means for holding the magnet body in the stop positions comprises a ferromagnetic element extending parallel to the axis of rotation of the magnet body and substantially facing one of the magnet poles in the stop positions of the magnet body.

8. A scanner as claimed in claim 7, wherein the ferromagnetic element forms part of a ferromagnetic plate-shaped body to which the coil means are secured, the coil means extending between the plate-shaped body and the magnet body.

9. A scanner as claimed in claim 8, wherein the plate-shaped body has upright edge portions between which the magnet body and the coil means extend.

* * * * *